United States Patent [19]

Matsuno et al.

[11] Patent Number: 4,719,329

[45] Date of Patent: Jan. 12, 1988

[54] CAN BODY AND METHOD OF MAKING THE SAME

[75] Inventors: Kenji Matsuno, Yokohama; Hiroshi Matsubayashi, Kamakura; Kazuhisa Ishibashi, Tokyo; Kazuma Kuse; Nobuyuki Sato, both of Yokohama, all of Japan

[73] Assignee: Toyo Seikan Kaisha, Limited, Tokyo, Japan

[21] Appl. No.: 895,928

[22] Filed: Aug. 13, 1986

[30] Foreign Application Priority Data

Jul. 7, 1986 [JP] Japan ................... 61-159468

[51] Int. Cl.⁴ .............................................. B23K 26/00
[52] U.S. Cl. ................... 219/121 LD; 219/160; 413/77
[58] Field of Search ................ 413/74, 77; 219/160, 219/121 LC, 121 LD

[56] References Cited

U.S. PATENT DOCUMENTS

3,668,360  6/1972  Ballis ................................. 219/160
4,577,088  3/1986  Sharp ......................... 219/121 LD

*Primary Examiner*—C. L. Albritton
*Attorney, Agent, or Firm*—Samuel Meerkreebs

[57] ABSTRACT

A can body of surface treated steel plate, such as TFS, having adjacent longitudinally extending edges of tubular shaped member welded by irradiation of laser beam and provided with inside surface of welded seam having reliable paint retaining characteristic and free from projections, such as upset. For the purpose, welding is carried out such that inside and outside width of molten-solidified zone and structure changed zone will be maintained within a predetermined range and that metallic wire or elongated backing strip is located oppositely to lower surface of both edges being butt-welded.

8 Claims, 8 Drawing Figures

CAN BODY AND METHOD OF MAKING THE SAME

The present invention relates to a can body and method of making the same, more particularly a can body having continuous laser welded seam of adjacent longitudinally extending edges of a tubular shaped member formed of surface treated steel plate and method of making the same.

DESCRIPTION OF PRIOR ART

U.S. Pat. No. 4,436,979 describes an undesirable slight weld upset projecting outwardly from inside surface of tubular shaped member, which is produced as a result of laser beam welding of adjacent longitudinally extending edges of the same member.

Light from the laser beam passing through the weld joint area is thought to produce this upset, which will unfavorably effect the function and appearance of the weld. According to this U.S. Patent, laser beam dump means is provided adjacent the welding area for absorbing the light from laser beam produced by the laser welding apparatus. However, the laser beam dump means will make it difficult to locate an effective aligning means for both longitudinally extending edges immediately below the weld joint area.

PROBLEMS TO BE SOLVED BY THE PRESENT INVENTION

The present invention contemplates eliminating the weld upset produced by the light from laser beam passing through the weld joint area, to establish a limit of allowable size of the weld upset produced on the internal surface of welded tubular member, and to minimize vanishment or deterioration of the surface treated layer of the blank, such as tin free steel, inevitably caused by welding operation.

OBJECT OF INVENTION

An object of the present invention is to provide a can body of surface treated steel plate having a longitudinal butt seam welded by continuous laser beam irradiation, the inside surface of which is enhanced in terms of corrosion resisting and film retaining properties in the welded area.

A further object of the present invention is to provide a can body and method of making the same, in which weld upset caused by light of laser beam passing through the longitudinal butt seam weld area is minimized.

An additional object of the present invention is to provide a can body and method of making the same, in which alignment of both longitudinally extending edges of tubular member is enhanced during laser beam welding operation.

According to the present invention, there is provided a can body having continuous laser welded seam of adjacent longitudinally extending edges of tubular shaped member formed of surface treated steel plate having 0.12~0.35 mm thickness, characterized in that external width W1 and internal width W2 of molten-solidified zone of welded part will meet requirement specified by following formulae (1) and (2):

$$W1 \leqq 0.3 \text{ mm} \quad (1)$$

$$W1/5 \leqq W2 \quad (2)$$

as illustrate in the accompanying drawing.

These and other objects, features and advantages of the present invention will become more apparent from the following description when taken in connection with the accompanying drawings, in which:

DESCRIPTION OF PREFERRED EMBODIMENT(S)

Figure 1:
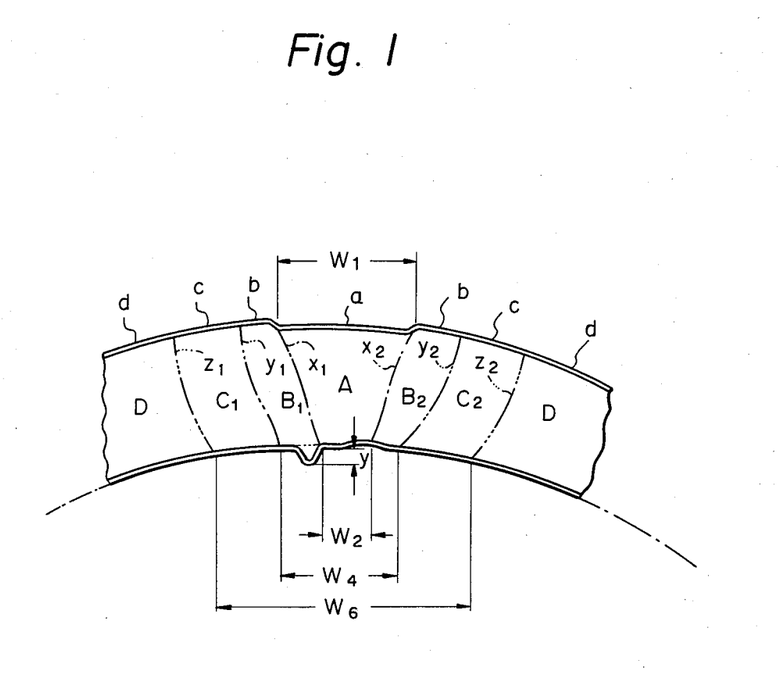
FIG. 1 is a diagramatic cross sectional view showing a butt seam of both longitudinally extending edges of a can body welded by laser beam irradiation.

Referring now to FIG. 1, the welded part comprises a molten-solidified zone A defined by border lines $x_1$, $x_2$ on both sides, structure changed zones B1 and B2, that is, zones each having steel structure changed in solid phase by heat generated during welding operation, defined by border lines ($x_1$ $y_1$) and ($x_2$ $y_2$) respectively and heat effected zones C1 and C2, that is, zones having surface treated layer deteriorated but the steel structure not affected by heat generated during welding operation, each defined by border lines ($y_1$ $z_1$) and ($y_2$ $z_2$). Area D located on the outside of border lines $z_1$, $z_2$ is a normal area having no change sustained in steel structure, nor in surface treated layer.

In the case of welded can body made of tin free steel, the surface treated layer d of normal area D comprises a layer of metallic chromium and a layer of chromate laid over the former. Surface layer c of the heat effected zone C consists a mixture of chrome oxide, iron and iron oxide. Surface layer b of the structure changed zone B and surface layer a of the molten-solidified zone A consist a mixture of iron and iron oxide.

In case of the can body of tin plated steel plate, surface treated layer d of the normal zone D comprises a layer of tin-iron alloy, a layer of metallic tin laid over, and tin-iron alloy layer and a layer of chromate laid over said metallic tin layer. Surface layer c of the heat effected zone C1, C2 includes tin-iron alloy, iron and iron oxide, some times a small amount of metallic tin. Surface layer b of the structure changed zone B1, B2 and surface layer a of the molten-solidified zone A consist iron and iron oxide, some times a small amount of tin-iron alloy.

According to the present invention, in case internal width W4 of the structure changed zone B1, B2 and internal width W6 of the heat effected zone C1, C2 of the welded can body in preferable range in desired, external width W1 and internal width W2 of the molten-solidified zone A must meet the requirement $W2 \geq W1/5$, specified by formulae (1) and (2) described above. In this case, internal width W4 of the structure changed zone B1, B2 of can body of tin free steel will be, for instance, less than 0.25 mm and internal width W6 of the heat effected zone C1, C2 will be less than 0.5 mm.

In case of the can body of tin free steel, corrosion resisting property of internal surface of the welded part is normally inferior to that of non-welded portion of the can body having sound surface layer of chromium related group preserved, even though the welded portion having a surface layer of chromium related group vanished or deteriorated by welding operation is repaired by some kind of organic coatings. However, in case of the internal width W4 of structure changed zone B1, B2 and the internal width W6 of heated effected zone C1, C2 being maintained in restricted range according to the present invention, a can body having inside coating of more than 3 $\mu$m in average, preferably more than 5 $\mu$m applied, is not inferior to any non-welded portion in terms of corrosion resisting property and hence practically useful. The reason for good corrosion resisting property of the welded portion being maintained without decline will be a support presented to the welded portion by adjacent non-welded portions on both sides to keep the coating in clinging condition. The support will be effectively extended since the width of deteriorated surface treatment layer is considerably small.

In order to provide a laser welded can body meeting the requirement specified by formulae (1) and (2) of the present invention, it is necessary to make the size of laser beam irradiated on butt seam smaller and a power density of the laser beam relatively larger.

In the case of a small power density of laser beam, regardless of the small size, a ratio W1/W2 of external width W1 to internal width W2 and a value W1 will become larger, simultaneously internal width W4 of the structure changed zone B1, B2 and the internal width W6 of the heated effected zone will also become larger, thereby affecting unfavourably to the corrosion resisting property.

Shortage of the power density of laser beam will reduce a power per unit volume of molten parts of the seam, extend the time required for melting a metal irradiated by the laser beam, decrease a rate of absorbtion of laser beam by non-molten part of the seam, and render the time required for melting an inner surface prolonged. For this reason, a welding speed will be lowered. Also, a difference of temperature between molten part and adjacent area will be reduced, thereby increasing a width of the heat effected zone C1, C2.

Particularly, in case of tin free steel plate, the width of the heat effected zone will be conspicuously enlarged, if the rate of absorbtion of the laser beam is low and the power density of the laser beam is small.

In case of a can body having molten-solidified zone A, external width W1 and internal width W2 of which will meet the requirement $W2 \geq W1/5$ specified by formulae (1) and (2), heat conduction from the above mentioned zone will be relatively small and the internal width of the heat effected zone will become small, thereby enabling the corrosion resisting property of welded part to become enhanced. However, in case of the welded part having external width W1 of molten-solidified zone A greater than 0.3 mm, a volume of molten metal will become larger, with the heat conduction therefrom increased, and the internal width of heat effected zone will be enlarged, rendering a good corrosion resisting property difficult to attain.

As described above, it is necessary to have a power density of the laser beam irradiated on can body sufficiently great for securing a welded part having a molten-solidified zone A, the external width W1 and the internal width W2 of which will meet the requirement $W2 \geq W1/5$ specified by formulae (1) and (2). However, an excessively great value of power density of the laser beam and excessively low welding speed will cause the laser beam pass through the welded part, and cause the inside surface of the welded part to swell out, causing a molten metal to protrude out of border lines between the molten-solidified zone A and structure changed zone B1, B2 and solidify therearound irregularly, thereby producing conspicuous irregularities extending in the direction of welding on inside surface. These irregularities will make protective coatings over protuberance thinner, sometimes exposing metallic surfaces and make excessively heavy coatings in depressions, which will form bubbles while baking, thereby causing the corrosion resisting property of the welded part to decline. Also, conspicuous protuberances will easily produce fractures when they are subjected to bead-making operation or necking-in operation. According to the present invention, a welded seam having substantially smooth inner surface is provided by having a metallic wire pressed against inner surface of butt seam in a position opposed to lower end of the laser gun.

Figure 2:
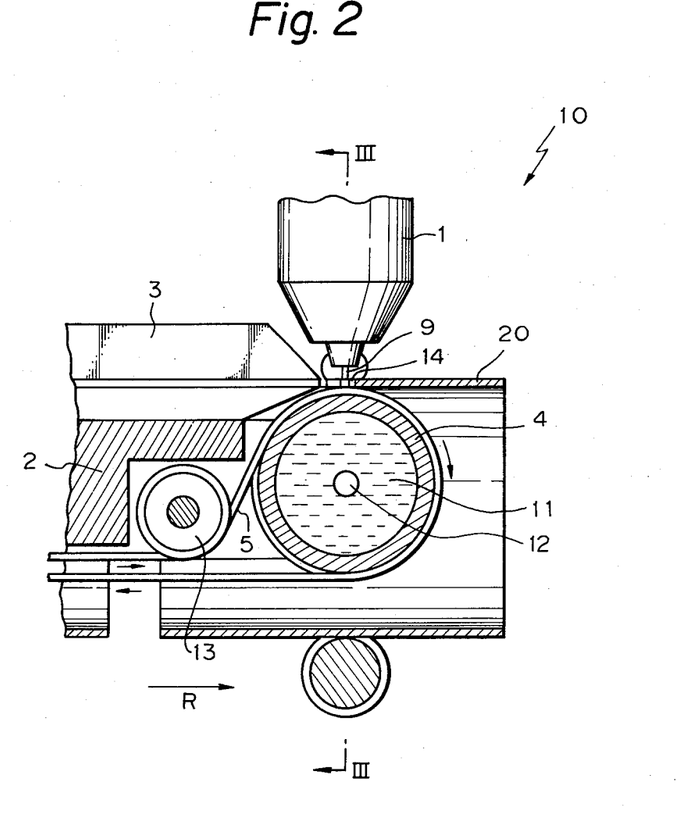
FIG. 2 is a cross sectional view showing a welding apparatus used for the method according to the present invention.
Figure 3:
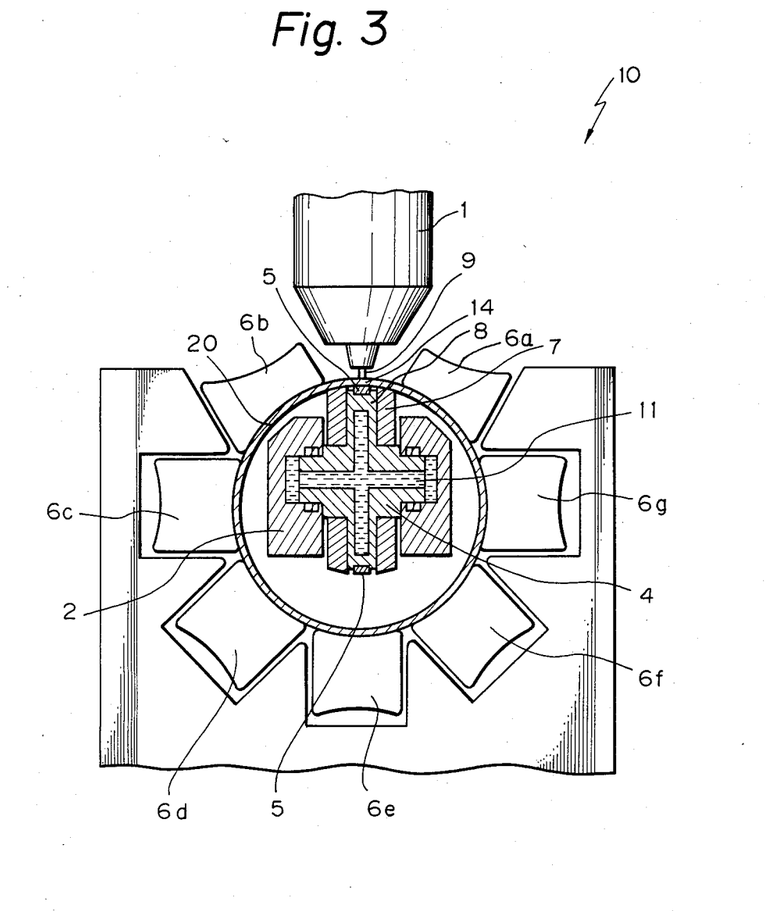
FIG. 3 is a cross sectional view taken on the plane of line III—III on FIG. 2.

Referring to FIGS. 2 and 3, one embodiment of laser beam welding apparatus 10 used for making a can body according to the present invention is shown. The laser beam welding machine 10 comprises a mandrel 2 inserted axially into a tubular shaped member 20 and a laser gun 1 disposed above the tubular shaped member 20 adjacent to right end of the mandrel 2. The mandrel 2 is provided with a Z-bar 3 mounted thereon in the upper part thereof, which has Z-shaped cross section and extends parallel to the tubular shaped member 20. The Z-bar 3 is provided with a pair of grooves (not shown) receiving both longitudinally extending edges of the tubular shaped member 20 and will bring both edges into aligned position on a same circle immediately below the laser gun 1. The mandrel 2 is provided at its right end with a roller 4 rotatably mounted thereon, which is located opposite the lower end of the laser gun 1 with a pair of adjacent longitudinally extending edges of the butt seam 14 held between the lower end of the laser gun 1 and the roller 4. The roller 4 will rotate about a shaft 12 and is provided with a circumferential groove 8 for receiving the metallic wire 5. The metallic wire 5 is inserted into the tubular shaped body 20 from left end thereof, will pass around a guide roller 13, which is located adjacent to right end of the mandrel 2, is led into a direction shown by arrow head, fitted into the groove 8 provided circumferentially in the roller 4, caused to pass nearly all around the roller 4, and then is taken outwardly from left end of the tubular shaped member 20. The metallic wire 5 is made of Aluminium or Copper alloys thereof and will operate to intercept the laser beam passing through the butt seam and debris of steel spread thereby and to prevent swelling, such as upset, of molten metal. Further, the metallic wire is in contact with inside surface of the welded part and cool the same surface down by absorbing heat therefrom. This cooling function will serve to suppress a tendency of widening of the structure changed zone B1, B2 and the heat effected zone C1, C2. The metallic wire 5 will also serve to prevent oxidation of the welded part and adjacent area. Alternatively, an elongated steel strip, such as backing strip or chill strip, extending a considerable length along and maintained in contact with inner surface of the welded part may be used, instead of the metallic wire 5 passing around the roller 4.

As shown in FIG. 3, a pair of annular magnets 7 are mounted on the roller 4 on both sides thereof and rotate together with the roller 4. Magnets 7 will attract both longitudinally extending edges forming the butt seam 14 uniformly so as to maintain the same in aligned position and prevent those edges from moving in circumferential direction. The roller 4 is provided with a water chamber 11 which is connected to suitable source of cooling water (not shown). A plurality of spool-shaped guide rollers 6a, 6b, 6c, . . . are disposed around the tubular shaped member 20 at uniform spacing so as to direct the butt seam 14 to predetermined position.

Another welding machine having same construction as that of the machine described above, but without the metallic wire 5 and provided with suitable support members of stainless steel for the butt seam instead of a pair of magnets 7, 7, was constructed so as to compare this welding machine with respect to the welding machine shown in FIGS. 2 and 3 for comparison purpose. Outcome of the testing showed that the welding machine of the present invention will serve to reduce the value of W1, W2, W4, W6 more effectively than the machine not utilizing the metallic wire 5 and magnets 7.

According to the present invention, a surface treated steel plate having a thickness 0.12–0.35 mm is preferable. In case of the thickness less than 0.12 mm, butt welding of high accuracy becomes difficult for the reason of flexing and deformation due to heat of the steel plate. On the other hand, in case of the surface treated steel plate having thickness in excess of 0.35 mm, external width W1 of the molten-solidified zone A exceeds 0.30 mm normally and internal width W6 of the heat effected zone C1, C2 becomes greater, thereby affecting unfavourably to corrosion resisting property.

A can body according to the present invention will have, for instance, internal surface of main part D and heat effected zone C1, C2 maintained on a cylindrical surface having a central axis coincident with longitudinal axis of the tubular shaped member 20, the internal width W4 of the structure changed zone B1, B2 is less than 0.25 mm, and internal width W2 of the molten-solidified zone A is 0.06~0.23 mm with external width Q1 maintained less than 0.3 mm. Further, a height of protuberance on inner surface of molten-solidified zone A from a cylindrical surface, which is concentric with the main part D and has same diameter as that of the main part D, is maintained less than 20 μm, and internal surface of both molten-solidified zone A and structure changed zone B1, B2 is substantially flush. Accordingly, in case of applying protective coating on inside surface of welded part, there will be no extremely thin coating even at protuberance, which will expose metallic surface and decline the corrosion resisting property. In case of the height of protuberance maintained less than 20 μm, there will be no fracture, nor any other flaw on the protective coating which is subjected to neck-in or bead forming operation. The internal width W6 of the heat effected zone C1, C2 is maintained less than 0.5 mm.

EXAMPLE 1

A tin free steel plate, having thickness of 0.21 mm and provided with metallic chromium layer having chromium density of 100 mg/m$^2$ and chromate layer having chromium density of 10 mg/m$^2$ laid over the former, was coated on the surface, which is supposed to become inner surface of the can body, with paint of epoxyi-phenol family, leaving the welded part and adjacent area unpainted, and coated on the other surface too, and was severed into blanks. This blank was shaped into tubular member with both longitudinally extending edges abutted against each other, having internal diameter of 65.3 mm and height of 104.7 mm.

Laser beam welding was carried out on this tubular member by using the apparatus shown in FIGS. 2 and 3, with the size and power density of laser beam and welding speed suitably selected. Internal width W4 of the structure changed zone A determined from a metallic structure, which was obtained by having a cross section of welded part of the tubular member etched for 10 seconds by 5% nitric acid alcohol solution, internal width W2, together with external width Q1 of the molten-solidified zone A determined from the metallic structure which was obtained by having a cross section of welded part etched for 2 minutes by 5% picric acid alcohol solution, and a height y of protuberance y on the inside surface of welded part are shown in Table 1.

Figure 4A:
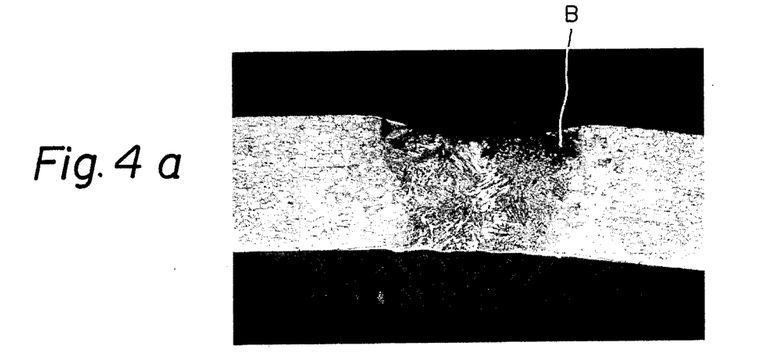
FIG. 4a is a microscopic photograph showing a vertical section of a welded part pf a can body taken perpendicularly to the direction of welding, etched by a 5% nitric acid alcohol solution.
Figure 4B:
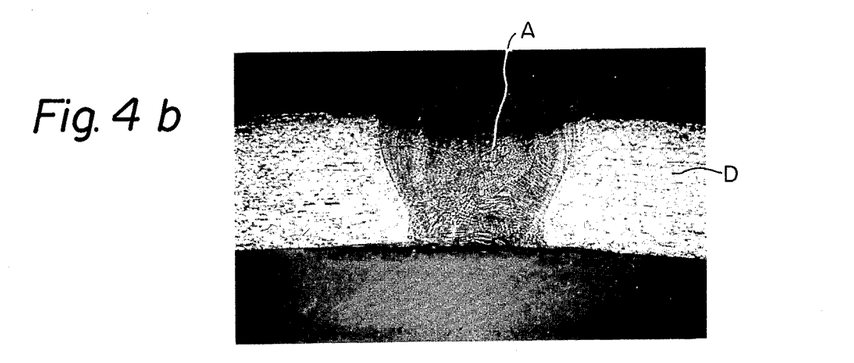
FIG. 4b is a microscopic photograph showing the same vertical section as that of FIG. 4a etched by a 5% picric acid alcohol solution.

Microscopic photographs of metallic structure, which was obtained by having a cross section perpendicular to direction of welding of No. 1 test specimen etched by 5% nitric acid alcohol solution and separately by 5% picric acid alcohol solution, are respectively shown in FIG. 4a and FIG. 4b. In these photographs, A, B and D show the molten-solidified zone, structure changed zone, and non-welded zone respectively.

Figure 5:
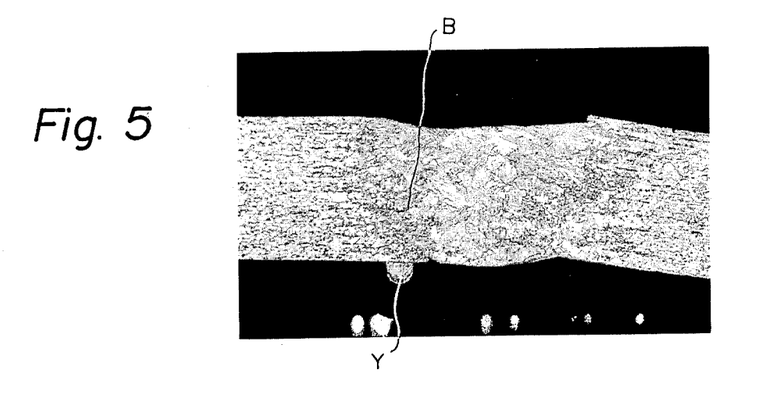
FIG. 5 is a microscopic photograph showing a cross section of test specimen No. 5, etched by a 5% nitric acid alcohol solution.
Figure 6:
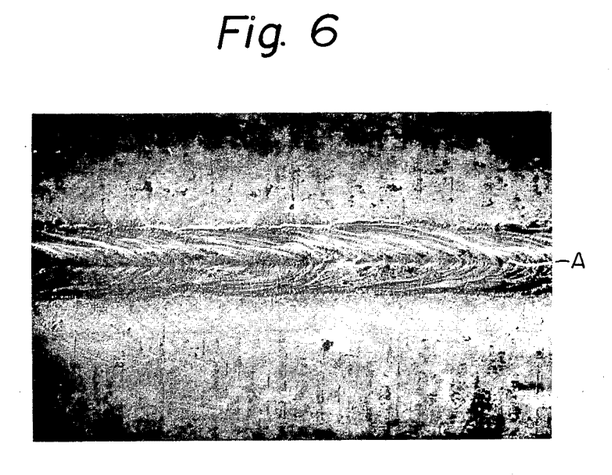
FIG. 6 is a magnified photographic picture taken by a scanning type electronic microscope showing inside of the welded part of test specimen No. 1.
Figure 7:
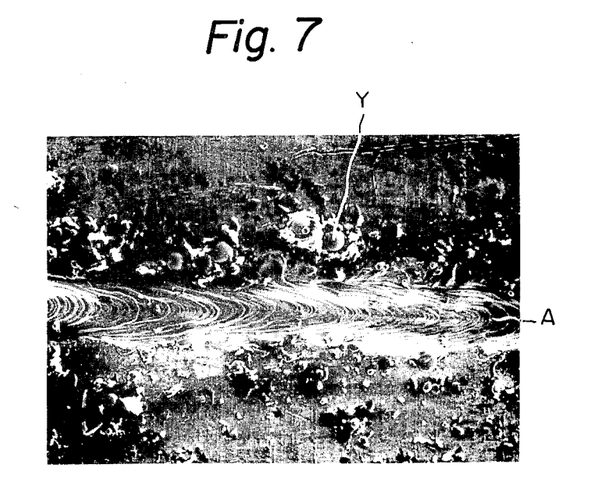
FIG. 7 is a magnified photographic picture taken by a scanning type electronic microscope showing the inside of the welded part pf test specimen No. 5.

A photographic picture of microscopic structure, which was obtained by having a longitudinal section of welded part of No. 5 test specimen etched by 5% nitric acid alcohol solution, is shown in FIG. 5. In this picture, Y shows a protuberance produced on the inside surface of welded part. Microscopic photographs of internal surface of welded part of No. 1 and No. 5 test specimen, which were taken by using scanning type electronic camera, are shown respectively in FIG. 6 and in FIG. 7.

Protective coating of epoxyi-phenol family was applied on the welded part and adjacent area over approximately 5 mm width and then baked. The thickness of coating was 8–10 μm in average after baking. Then, the can body was flanged at both ends. A can end of tin free steel plate having inner surface thereof applied with protective coating was double-seamed to the tubular member so as to produce a container can body.

The can body was filled with cooked fish, and a lid of tin free steel plate having inner surface applied with protective coating was hermetically double-seamed to the open end, and thereafter sterilized in retort for 90 minutes at a temperature of 116° C. This canned food was stored at 50° C. for six months and thereafter opened up to check up corroded condition of the inner surface of welded part. Number of perforrations produced per 100 cans stored during 6 months was investigated and the outcome is shown in Table 1.

Table 1 carries also various data of welded parts which were made by the contrast machine lacking metallic wire 5 and ring-shaped magnets 7.

EXAMPLE 2

A tin free steel plate, having a thickness of 0.18 mm and provided with metallic chromium layer having chromium density of 100 mg/m$^2$ and chromate layer having chromate density of 15 mg/m$^2$, was applied on one surface, which is supposed to become inner surface of the can body, with paint of epoxyi-phenol family, with opposite surface being printed as desired, was severed into blanks. Those blanks of tin free steel were shaped into tubular members, and laser beam welding was carried out on those tubular members under various conditions as shown in Table 2 by using a welding machine shown in FIG. 2 and 3. Several welded can bodies were made also by the contrast machine, similarly to the case in Example 1.

The internal width W4 of the structure changed zone B1, B2 determined from a metallic structure, which was obtained by having a cross section of welded part of the tubular member etched for 10 seconds by 5% nitric acid alcohol solution, and internal width W2, together with external width W1 of the molten-solidified zone A determined from the metallic structure which was obtained by having a cross section of welded part etched for approximately 2 minutes by 5% picric acid alcohol solution are shown in Table 2. And maximum height y of protuberance on the inside surface of the molten-solidified zone A is also shown in Table 2.

Protective coating of epoxyi-phenol family was applied on the welded part over approximately 5 mm width, and then baked. Thickness of protective coating was 8–10 μm in average after baking. The can body was flanged at both ends and then an end plate of tin free steel plate having inside surface coated was double-seamed to the can body.

The can body was filled with cooked fish, and a lid of tin free steel plate having inner surface applied with protective coating was hermetically double-seamed to the top end, and thereafter sterilized in retort for 90 minutes at a temperature of 116° C. This canned food was stored at 50° C. for six months and thereafter opened up to check up corroded condition of the inner surface of welded part. Number of perforations produced per 100 cans stored during 6 months was investigated, and the outcome is shown in Table 2.

EXAMPLE 3

A tin plate, having a thickness of 0.23 mm and provided on one surface with plated tin having a density of 2.8 g/m$^2$, was coated on one surface, which is to become inner surface of can body, with paint of epoxyi-phenol family, leaving the to-be-welded part and adjacent area unpainted, with the other surface suitably coated, was severed into blanks.

In addition to tubular shaped members intended for regular testing using the welding machine according to the present invention, extra tubular shaped members intended for contrast welding machine have been also prepared similarly to the case of Example 1.

The internal width W4 of the structure changed zone B1, B2, internal width Q2 together with external width Q1 of the molten-solidified zone A, and the height y of protuberance on the internal surface of the molten-solidified zone A determined from the metallic structure of cross-section of the welded part are shown in Table 2.

Protective coating of epoxyi-phenol family was applied on the inside surface of welded part and adjacent area over 5 mm width and then baked. Thickness of protective coating after baking was 8–10 μm in average. Then, a container can was made by providing flanges at both ends and thereafter by double-seaming an end plate of tin free steel plate having inside coating onto the tubular shaped member.

The container can was filled with cooked fish. An end plate having inside coating was hermetically double-seamed on open end of the can body. The packed can was retort sterilized at 116° C. for 90 minutes, and stored at 50° C. for six months, and then opened to check up the corroded condition of inside surface of welded part. And number of perforations produced per 100 cans during 6 months period was also investigated. The outcome is shown in Table 2. According to the present invention, adhesive property and hence corrosion resisting property of protective coating applied on the inside surface of the welded part after welding is enhanced when carrying out laser beam welding on a butt seam of can body.

TABLE 1

| | MADE BY APPARATUS OF PRESENT INVENTION | | | | MADE BY CONTRAST APPARATUS | | |
|---|---|---|---|---|---|---|---|
| | SPECIMEN NO. | | | | | | |
| | 1 | 2 | 3 | 4 | 5 | 6 | 7 |
| WELDING SPEED m/min. | 12 | 15 | 10 | 10 | 12 | 12 | 8 |
| LASER BEAM DIAMETER mm | 0.20 | 0.16 | 0.16 | 0.20 | 0.20 | 0.20 | 0.22 |
| LASER BEAM POWER DENSITY kw | 1.0 | 1.0 | 0.80 | 1.0 | 1.0 | 0.3 | 1.0 |
| W4 mm | 0.21 | 0.15 | 0.10 | 0.24 | 0.27 | 0.40 | 0.42 |
| W6 mm | 0.38 | 0.30 | 0.30 | 0.40 | 0.42 | 0.80 | 0.75 |
| W2 mm | 0.20 | 0.10 | 0.07 | 0.22 | 0.23 | 0.10 | 0.30 |
| W1 mm | 0.29 | 0.20 | 0.25 | 0.30 | 0.30 | 0.35 | 0.35 |
| y μm | 0 | 0 | 0 | 15 | 35 | 0 | 40 |
| INSIDE CONDITION | NORMAL | NORMAL | NORMAL | LOCAL CORROSION SLIGHTLY | CORROSION ON PROTUBERANCE | CORROSION ALL OVER | CORROSION ALL OVER |
| PERFORATION | 0 | 0 | 0 | 0 | 0 | 0 | 2 |

TABLE 2

| | EXAMPLE 2 | | EXAMPLE 3 | |
| --- | --- | --- | --- | --- |
| | SPECIMEN NO. | | | |
| | 9 | 10 | 11 | 12 |
| APPARATUS USED | APPARATUS OF PRESENT INVENTION | CONTRAST APPARATUS | APPARATUS OF PRESENT INVENTION | CONTRAST APPARATUS |
| WELDING SPEED m/min. | 18 | 18 | 15 | 15 |
| LASER BEAM DIAMETER mm | 0.16 | 0.16 | 0.16 | 0.16 |
| LASER BEAM POWER DENSITY kw | 1.0 | 1.0 | 1.0 | 1.0 |
| W4 mm | 0.12 | 0.20 | 0.15 | 0.20 |
| W6 mm | 0.25 | 0.30 | 0.30 | 0.35 |
| W2 mm | 0.09 | 0.11 | 0.12 | 0.13 |
| W1 mm | 0.20 | 0.17 | 0.23 | 0.20 |
| y | 0 | 35 | 0 | 30 |
| INSIDE SURFACE | NORMAL | CORROSION ON PROTUBERANCE | NORMAL | CORROSION ON PROTUBERANCE & ADJACENT AREA |
| PERFORATION | 0 | 0 | 0 | 1 |

What is claimed is:

1. A can body having a continuous laser-welded seam of adjacent longitudinally extending edges of a tubular shaped member formed of surface-treated, steel plate having 0.12–0.35 mm thickness wherein an external width W1 and an internal width W2 of a molten-solidified zone of the welded part will meet the requirement specified by the formula $W1 \leq 0.3$ mm. and $W1/5 \leq W2$, characterized in that the height of a portion of the internal surface of said welded part and adjacent area thereof projecting from the internal surface of said tubular shaped member is maintained less than 20 $\mu m$, 2. A can body according to claim 1, wherein said internal width W2 of said molten-solidified zone is in a range of 0.06–0.23 mm.

3. A can body according to claim 1, wherein the width of the heat-effected zone of said welded part is less than 0.5 mm.

4. The method of making a can body comprising the steps of:

A. supporting a surface-treated steel plate with longitudinally extending edges thereof disposed in confronting relation to form a tubular-shaped member; and B. laser-beam welding said confronting, longitudinally extending edge by applying the laser beam toward the external surface of the steel plate while preventing leakage of the laser beam out of the internal surface of the plate.

5. The method according to claim 4, wherein the preventing of leakage of the laser beam is effected by positioning a metalic backing strip beneath said confronting longitudinally extending edges.

6. The method according to claim 5, wherein said tubular shaped member is continuously conveyed in its longitudinal direction while simultaneously continuously paying out said metalic backing strip.

7. The method according to claim 5, wherein a magnetic force is applied to said confronting longitudinally extending edges and maintains them in alignment when welding is effected.

8. The method according to claim 7, wherein said magnetic force is applied by means of a pair of roller-shaped permanent magnets, one of each of said rollers being disposed beneath a respective one of said longitudinally extending edges.

* * * * *